United States Patent [19]

Zankl et al.

[11] 4,358,888
[45] Nov. 16, 1982

[54] AUTOMATIC TOOL CHANGER WITH INTERNAL TOOL STORAGE MAGAZINE

[75] Inventors: Frank Zankl, Brookfield; Charles B. Sipek, Hales Corners; Alvin L. Cleek, Wauwatosa, all of Wis.

[73] Assignee: Kearney & Trecker Corporation, Milwaukee, Wis.

[21] Appl. No.: 197,641

[22] Filed: Oct. 16, 1980

[51] Int. Cl.³ .................................... B73Q 3/157
[52] U.S. Cl. .................................... 29/568; 29/26 A; 408/35; 414/223
[58] Field of Search ................. 29/568, 26 A; 408/35; 414/749, 750, 223

[56] References Cited

U.S. PATENT DOCUMENTS

| | | | |
|---|---|---|---|
| 2,139,234 | 12/1938 | Johnson | 308/6 |
| 2,382,825 | 8/1945 | Somes | 308/6 |
| 2,382,826 | 8/1945 | Somes | 308/3 |
| 2,571,049 | 10/1951 | Meylich | 409/237 |
| 2,926,554 | 3/1960 | Weidig | 408/235 |
| 3,018,697 | 1/1962 | Schroeder et al. | 409/237 |
| 3,191,260 | 6/1965 | Jorgensen | 29/568 X |
| 3,292,235 | 12/1966 | Riedel | 29/26 |
| 3,327,571 | 6/1967 | Sawada | 408/235 |
| 3,431,635 | 3/1969 | Balding | 29/568 |
| 3,452,427 | 7/1969 | Lehmkuhl et al. | 29/568 |
| 3,524,248 | 8/1970 | Dürr et al. | 29/568 |
| 3,530,570 | 9/1970 | Shotter | 29/568 |
| 3,722,363 | 3/1973 | Hague et al. | 409/233 |
| 4,102,035 | 7/1978 | Voglrieder et al. | 29/568 |
| 4,122,598 | 10/1978 | Pegler | 29/568 |
| 4,149,822 | 4/1979 | Lehmkuhl | 408/235 |
| 4,173,817 | 11/1979 | Voglrieder et al. | 29/568 |

OTHER PUBLICATIONS

Sales Brochure for Hille Machine Tool Model nb-v-93, (Distributed at Hanover Machine Tool Show, Hanover, Germany, 1967).

Primary Examiner—William R. Briggs
Attorney, Agent, or Firm—Cyril M. Hajewski

[57] ABSTRACT

A vertical spindle numerically controlled machining center includes a stationary bed or base on which a workpiece holding table is slidably mounted for movement along a first axis. A vertically extending upright or column, having a vertically reciprocal spindlehead slidably mounted thereon, is slidably mounted on the bed for movement along a second axis perpendicular to the first axis so that the spindlehead overlies a portion of the table. Within the upright is a recess adjacent to the bed. A tool storage magazine is located in the recess and is slidably mounted on the bed for movement through the recess along an axis parallel to the second axis. During a tool change cycle, the toolholder then held in the spindle is returned to the tool storage magazine by first moving the spindlehead to the ready position and then moving the tool storage drum toward the spindlehead to engage the tool then held in the spindle. To provide the spindle with a new tool, the spindlehead is first moved upwardly to clear the toolholder shank and then the tool storage drum is indexed to position a new tool directly beneath the spindle so that the spindle can engage the tool when the spindlehead is moved downwardly to the ready position.

15 Claims, 18 Drawing Figures

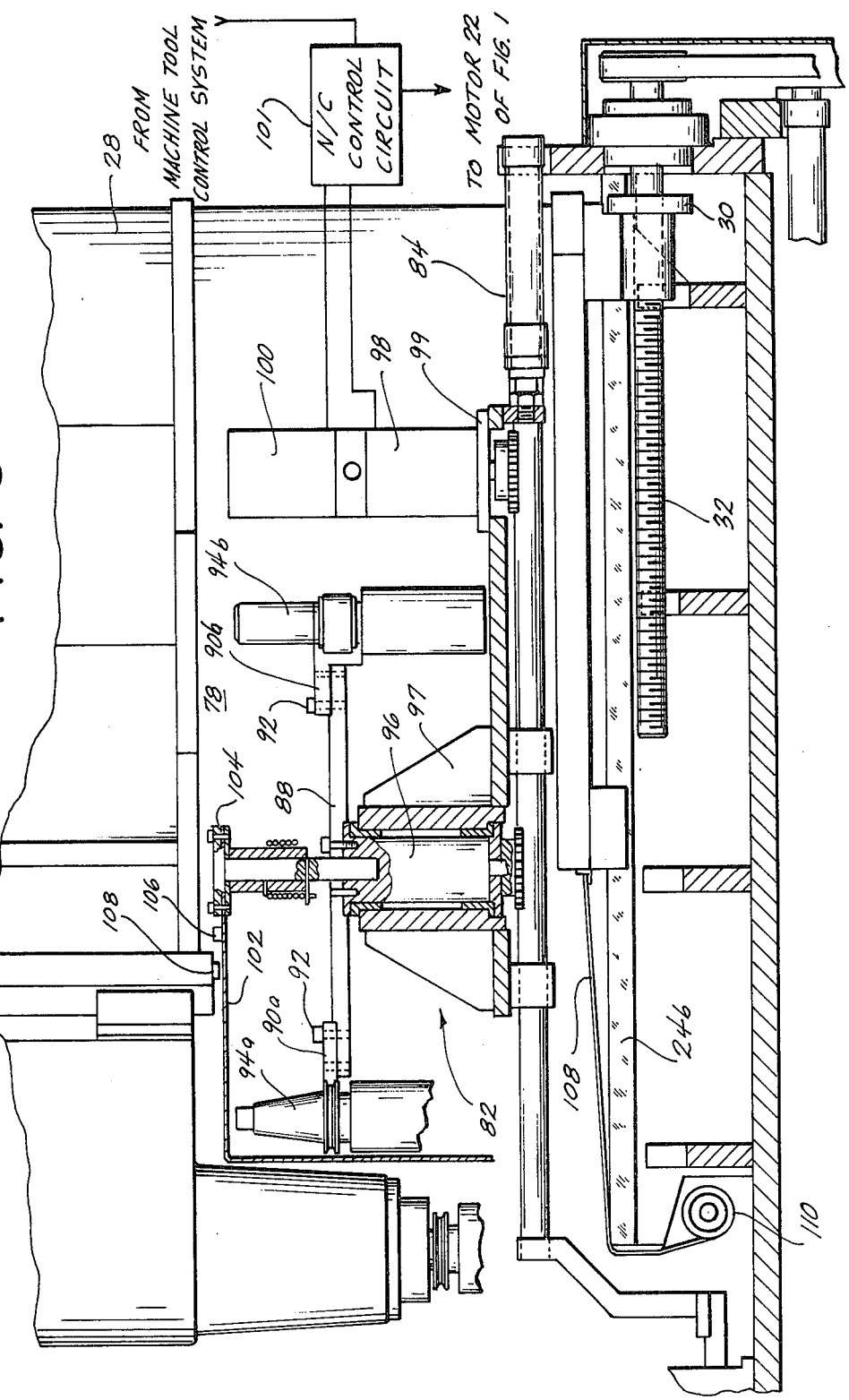

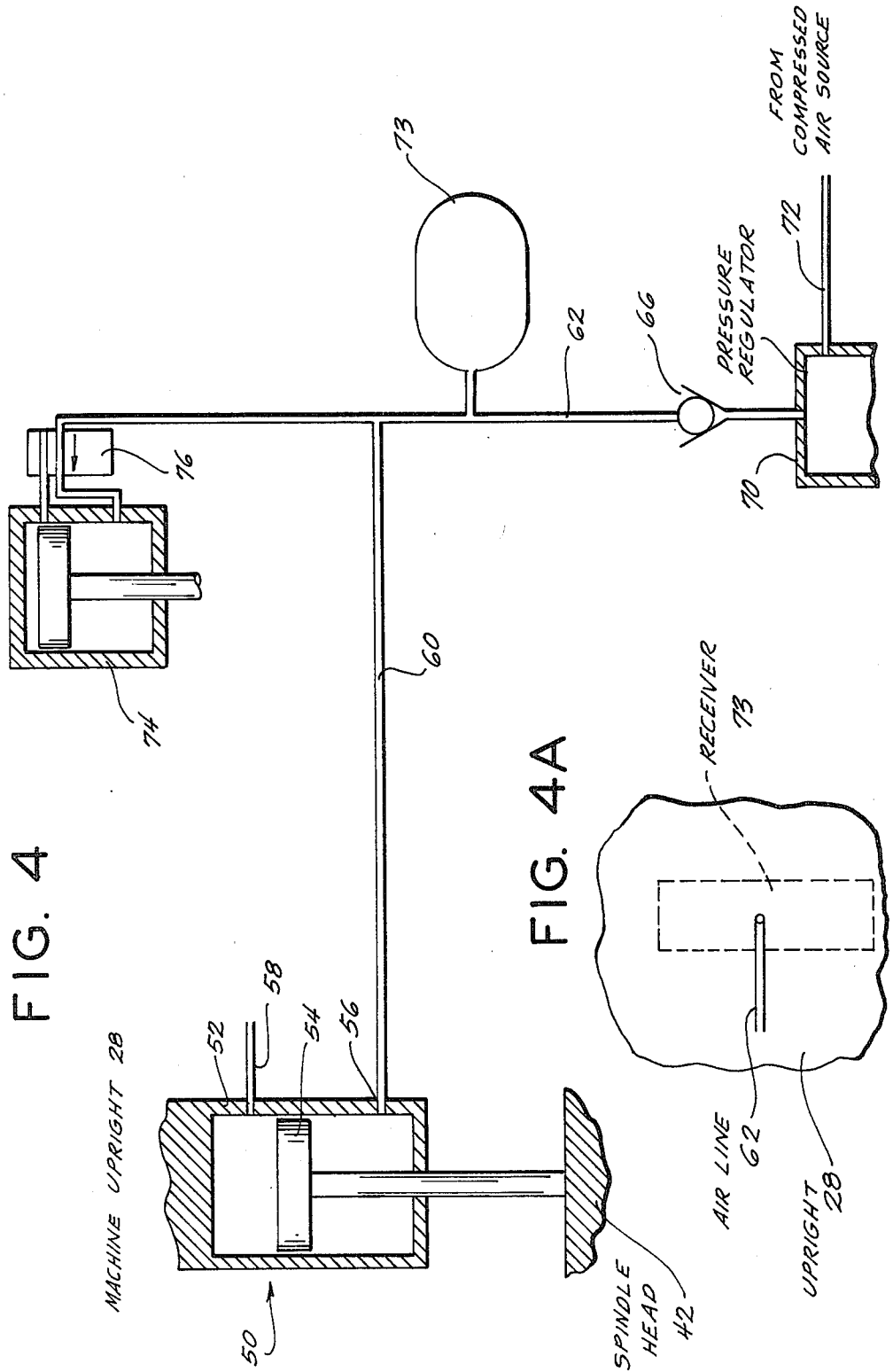

AUTOMATIC TOOL CHANGER WITH INTERNAL TOOL STORAGE MAGAZINE

BACKGROUND OF THE INVENTION

This invention relates to machine tools with automatic tool changers and more specifically, to a machine tool having an internally mounted automatic tool changer.

The advent of automatic tool changers on machine tools has greatly improved producivity by allowing for complete automation of machine operation. Exchange of a cutting tool held by the machine spindle with a new tool, which previously required the efforts of a human operator, can now be effectuated automatically by the machine, thereby permitting unmanned machine tool operation for long periods of time. The only time it may be necessary for a human operator to intervene during machine operation is when a tool must be replaced, due either to wear or breakage.

Present day automatic tool changing machine tools include a tool storage magazine located either above, behind, or to one side of the machine tool spindle.

During a tool change cycle, the tool storage magazine is rotated to place a selected one of the tool holding sockets in the tool storage magazine in a ready position within the reach of a tool transfer arm. The tool transfer arm, actuated under the command of the machine tool control system, transfers the tool at the ready position to the spindle and returns the tool formerly held in the spindle to the tool storage magazine at the ready position. Subsequent rotation of the tool storage magazine places a new tool in the ready position to facilitate another tool exchange.

Typically, the tool storage magazine carries a large number of cutting tools, each weighing between 15 and 20 Kg. (30 to 40 lbs.). Because of the weight of the tools, as well as their size, mounting of the tool storage magazine above, behind, or to the side of the spindle requires considerable modification of conventional machine tool designs to avoid interference with machine tool operations. Further, mounting of the tool storage magazine above, below, or to the side of the spindle incurs the disadvantage that mounting of the tool storage magazine in this manner is likely to expose the cutting tools carried therein to metal chips and coolants disseminated during machining operations. Excessive exposure to such chips and coolant during machining operations can lead to not only tool damage but also to damage to the tool storage drum itself.

In contrast, the present invention concerns a machine tool having a tool storage magazine slidably mounted within the machine tool upright which permits the tool storage magazine to be retracted into the recess and away from the spindle during machining operations thereby virtually eliminating interference with machine operation, as well as shielding the cutting tools carried thereon from disseminated coolant and chips.

It is an object of the present invention to provide a machine tool having an internally mounted automatic tool changer retractable into the machine tool upright which virtually eliminates interference between the tool changer and the machine tool during machining operations.

It is another object of the present invention to provide a machine tool having an internally mounted automatic tool changer retractable into the machine tool upright to shield cutting tools from metal coolant and chips disseminated during machining operations.

It is yet another object of the present invention to provide a machine tool having an internally mounted automatic tool changer retractable into the machine tool upright having reduced complexity and cost in comparison with other present day automatic tool changers.

BRIEF SUMMARY OF THE INVENTION

Briefly, in accordance with the preferred embodiment of the invention, an automatic tool changing machining center rapidly effectuating exchange of cutting tools without need of a tool transfer arm comprises a worktable for holding a workpiece which is slidably mounted on the bed for movement along a first axis. A vertically extending column or upright is slidably mounted to the stationary bed for movement along a second axis perpendicular to the first axis. A spindlehead, having a rotatably mounted spindle therein, is slidably mounted on the upright to overlie the table and is movable on the column along an axis orthogonal to the first and second axes. Within the column adjacent to the bed is a recess in which is disposed a tool storage magazine having a plurality of tool grippers thereon, each securing a toolholder therein. The tool storage magazine is slidably mounted on the bed for movement through the recess along an axis parallel to the first axis.

To exchange a toolholder then held in the spindle with a toolholder held by one of the tool grippers of the tool storage magazine, the spindlehead is first moved to a tool change position. The tool storage magazine then moves outwardly from the recess so that the empty tool gripper on the tool storage magazine assigned to the toolholder then held in the spindle engages the toolholder held in the spindle. Thereafter, the toolholder then in the spindle is unclamped, the spindlehead moves upwardly to clear toolholder shanks, and then the tool storage drum is indexed to place a selected one of the toolholders held therein in a ready position directly beneath the spindle. Finally, the spindlehead moves downwardly to engage the spindle with the selected toolholder. Once the spindle engages the new toolholder, the new toolholder is clamped therein and the spindlehead returns to the work zone while the tool storage magazine retracts to its original position within the recess.

BRIEF SUMMARY OF THE DRAWINGS

The features of the invention believed to be novel are set forth with particularity in the appended claims. However, the invention, itself, both as to organization and method of operation, together with further objects and advantages thereof may best be set forth by reference to the following description taken in conjunction with the accompanying drawings in which:

FIG. 3 is a cut-away enlarged view of a portion of the vertical machining center of FIG. 2;

FIG. 4 is a block diagram of the pneumatic system for counterbalancing the spindlehead of the vertical machining center of FIGS. 1 and 2;

FIG. 4A is a cut-away view of the machine tool upright of FIGS. 1 through 3 illustrating an alternate embodiment of air receiver employed in the pneumatic system of FIG. 4;

DETAILED DESCRIPTION OF THE PREFERRED EMBODIMENT

Figure 1:
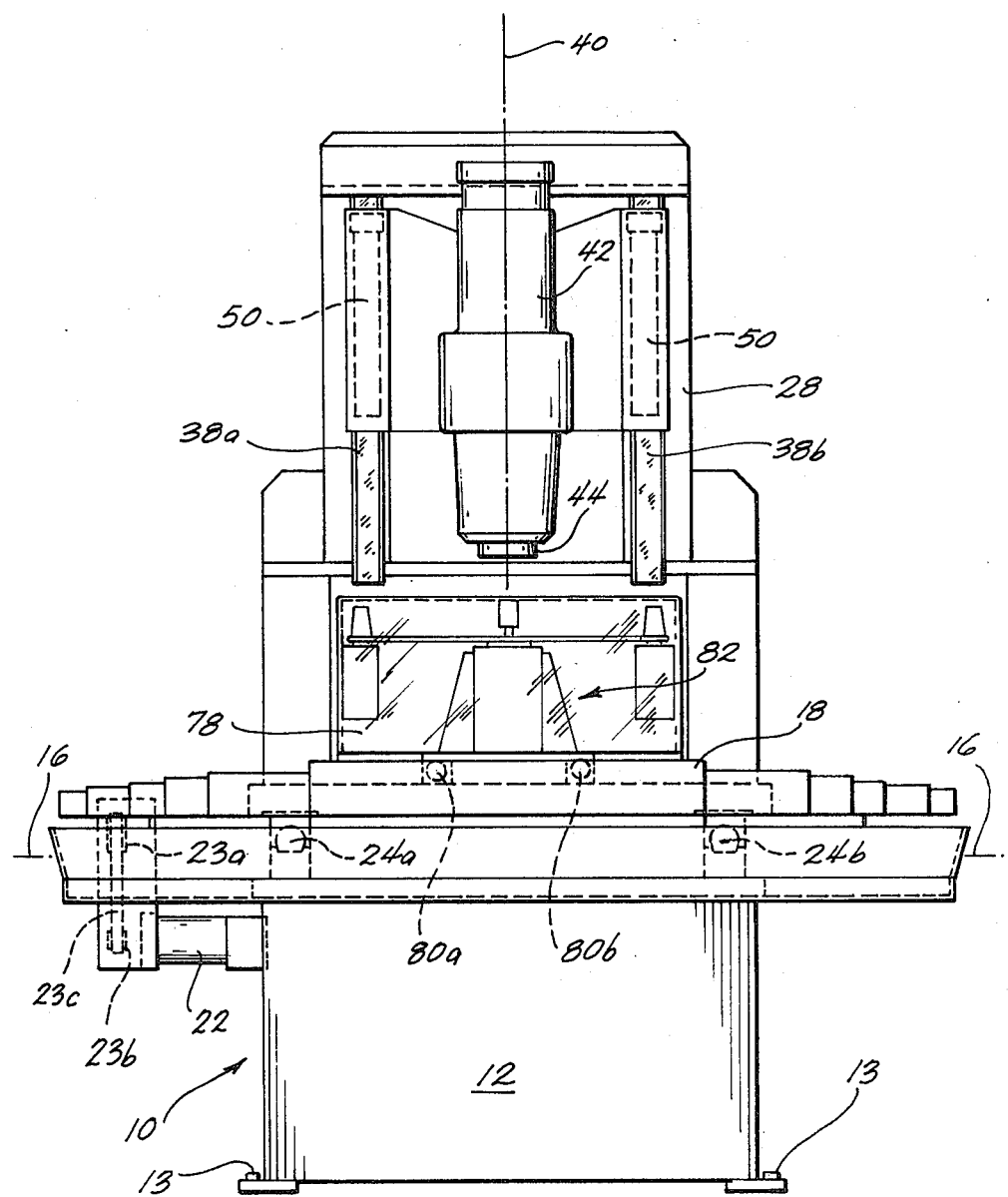
FIG. 1 is a front elevational view of a vertical machining center in accordance with the preferred embodiment of the invention.
Figure 2:
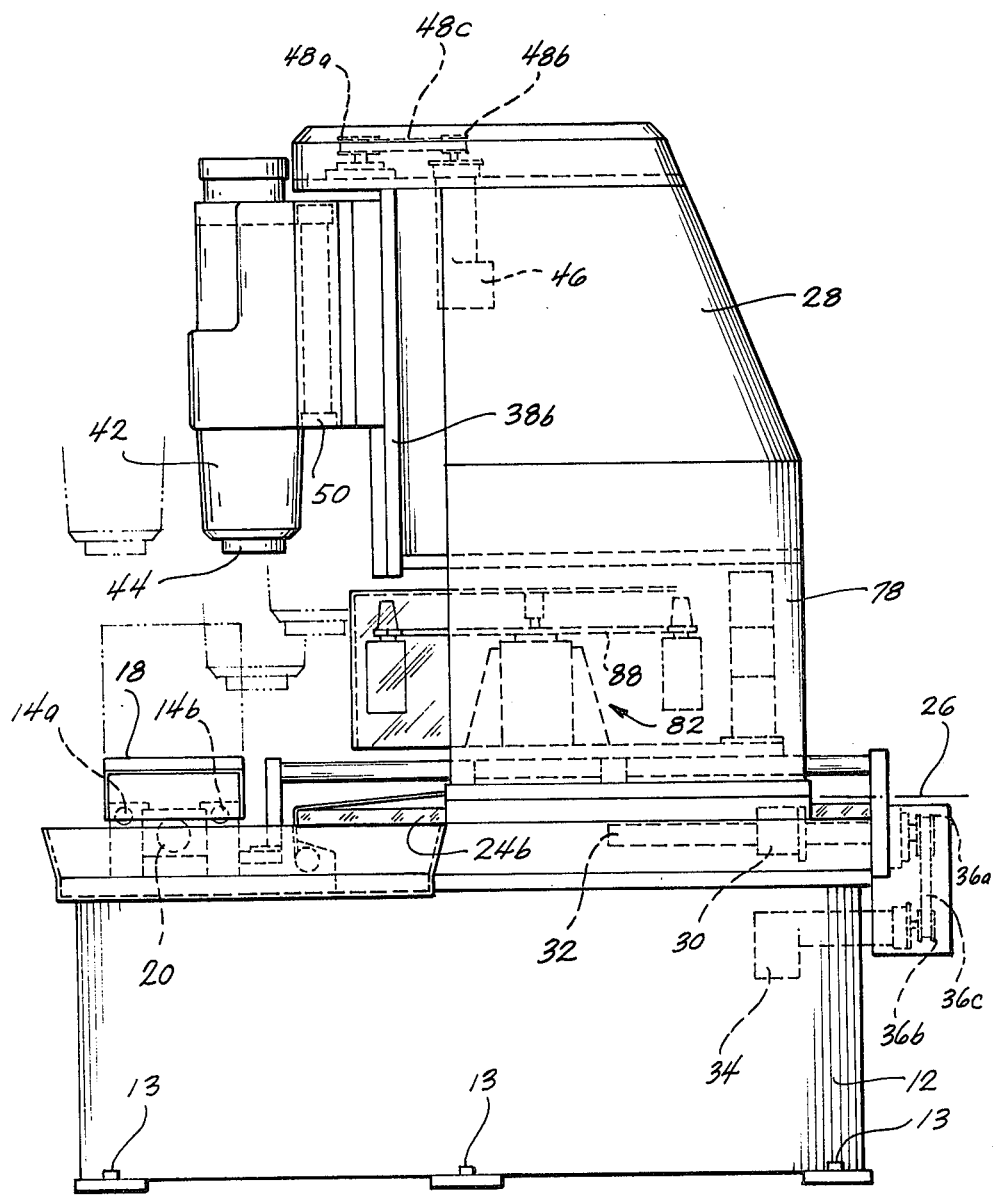
FIG. 2 is a side elevational view of the vertical machining center of FIG. 1.

FIGS. 1 through 3 illustrate the front side and enlarged cut-away side elevational views, respectively, of the improved vertical machining center 10 according to the present invention. Machining center 10 comprises a base or bed 12 mounted to the floor by leveling bolts 13. A pair of ways 14a and 14b (illustrated in FIG. 2) are mounted on bed 12 so that each is parallel to a first axis 16 (illustrated in FIG. 1). A table 18, for holding a workpiece thereon, is supported by bearings (not shown) on ways 14a and 14b for movement therealong. A ball nut 20 (illustrated in FIG. 2) is firmly affixed to the under surface of table 18 and engages a ball screw (not shown) which is journaled in bed 12 for rotation about axis 16. The ball screw is driven by a motor 22 (FIG. 1) through combination of pulleys 23a and 23b and belt 23c (FIG. 1). Thus, by controlling the direction of motor 22 rotation, the position of table 18 along axis 16 can be controlled accordingly.

A pair of horizontal ways 24a and 24b (best illustrated in FIG. 1) are fastened to bed 12 so as to each be parallel to axis 26 (illustrated in FIG. 2), which axis is perpendicular to axis 16 (illustrated in FIG. 1). A vertically extending column or upright 28 is supported by bearings (not shown) on the ways 24a and 24b for movement therealong. Referring now to both FIGS. 2 and 3, a ball nut 30 is fastened to the base of upright 28 and threadedly engages a ball screw 32 which is journaled to bed 12 for rotation about an axis parallel to axis 26. Ball screw 32 is rotatably driven by a motor 34 through the combination of pulleys 36a and 36b and belt 36c (illustrated in FIG. 2). By controlling the direction of motor 34 rotation, movement of upright 28 on ways 24a and 24b along axis 26 can be controlled accordingly.

As best illustrated in FIG. 1, a pair of ways 38a and 38b are mounted on the front facing surface of upright 28 parallel to an axis 40, which axis is orthogonal to axes 16 and 26. A spindlehead 42, having a spindle 44 journaled therein for rotation about axis 40, is slidably mounted to ways 38a and 38b for movement along axis 40. Referring now to FIG. 2, a ball nut (not shown) is affixed to spindlehead 42 and engages a ball screw (not shown) journaled to upright 28 for rotation about an axis parallel to axis 40. The ball screw is rotatably driven by motor 46 through the combination of pulleys 48a and 48b and belt 48c. In this manner, movement of spindlehead 42 along ways 38a and 38b (illustrated in FIG. 1) can be controlled by regulating the direction of motor 46 rotation.

To reduce the stress on the spindlehead ball screw and its support bearings caused by the downward gravitation forces on spindlehead 42, a pair of air cylinders 50 (illustrated in FIGS. 1 and 2) are each mounted between spindlehead 42 and upright 28 for counterbalancing the spindlehead. Referring now to FIG. 4, which depicts the details of each of air cylinders 50, it can be seen that each air cylinder comprises a piston chamber or cylinder 52 having its base end fastened to machine upright 28. A piston 54, fastened at its end to spindlehead 42, is vertically reciprocal within piston chamber 52. When spindlehead 42 is moved upwardly, causing piston 54 to ascend into piston chamber 52, compressed air, admitted into the cylinder through a first port 56 distal from the cylinder base end, fills the expanding piston chamber volume forcing the piston upwards against the downward gravitational force, and thus, counterbalancing spindlehead 42 to prevent undue stress on the spindlehead ball screw and spindlehead ball screw support bearings. As piston 54 ascends into piston chamber 52, the air in the upper end of piston chamber 52 is expelled through a port 58 adjacent to the cylinder upper end. Port 58 also serves to admit air into piston chamber 52 as piston 54 descends during downward spindlehead movement.

Port 56, through which compressed air is admitted to piston chamber 52, is coupled through a line 60 to an air line 62 which is coupled through a check valve 66 and a pressure regulator 70 to a source of compressed air 72.

Coupled to air line 62 between port 56 and check valve 66 is a receiver 73. Receiver 73 typically takes the form of a separate stand alone air tank as shown in FIG. 4. Alternatively, as illustrated in FIG. 4a, receiver 73 may take the form of a hollow enclosure within a machine structure, such as the machine upright 28, having an inlet thereto connected to air line 62. Referring back to FIG. 4, it may also be possible for piston chamber 52 itself to function as the air receiver by extending the piston chamber length and shortening the piston 54 stroke.

Receiver 73 serves an important role in the operation of machining center 10 because it reduces the fluctuations in pressure of compressed air supplied to piston chamber 52 and to the other pneumatic devices represented schematically by a cylinder 74 which is coupled to line 62 by a control valve 76. To understand how receiver 64 reduces air pressure fluctuations, it will first be necessary to define the following terms:

$V_r$ = Volume of receiver 73.

$V_1$ = Maximum rod-end volume of piston chamber 52 which occurs when piston 54 is at its highest vertical position.

$V_2$ = Minimum rod-end volume of piston chamber 52 which occurs when piston 54 is at its lowest vertical position.

$V_a$ = Volume contained by all other pneumatic devices on machine tool 10 and represented schematically by the volume of cylinder 74.

A = Piston 54 face area at its rod-end.

$P_r$ = Pressure setting of regulator 70.

$P_{max}$ = Maximum system pressure.

Initially, it will be assumed that spindlehead 42, (illustrated in FIGS. 1 to 3) is stationary with air being admitted into piston chamber 52 through port 56 to force piston 54 vertically upwards against the downward gravitational force on the spindlehead. After a brief interval, the system pressure will stabilize at $P_r$ and the upward force exerted on piston 54, and hence, spindlehead 42 will be $AP_r$. If spindlehead 42 is moved vertially upwards, then the total pneumatic volume of the system increased because the rod-end volume of piston chamber 52 will have increased to $V_1$. The increase in pneumatic volume causes a corresponding drop in system pressure which regulator 70 immediately begins to correct by admitting more air into receiver 64. Eventually, the system pressure is restored to $P_r$.

When spindlehead 42 is moved vertically downwards, total pneumatic volume decreases, owing to the decrease in piston chamber 52 rod-end volume. Since check valve 66 prohibits reverse air flow, and since there are no relief valves present, the system pressure rises above $P_r$. The maximum system pressure occurs with spindlehead 42 at its lowest position and can be calculated approximately from:

$$P_{max} = P_r \left( \frac{V_r + V_1 + V_a}{V_r + V_2 + V_a} \right)^{1.4}$$

The ratio of $P_{max}$ to $P_r$ can be made smaller by making the quantity in parentheses closer to unity. Typically, $V_a$, $V_1$ and $V_2$ are fixed in accordance with machine requirements. Thus, configuring machine 10 with receiver 73 introduces an additional variable $V_r$ into the relationship. It can readily be observed from the foregoing relationship that the variation in system air pressure is reduced as $V_r$ is made larger.

Without the presence of receiver 73, $P_{max}$ could become larger than the maximum allowable system air pressure, and the higher pressure might lead to damaging of air cylinders 50, as well as other pneumatic components coupled to line 62. Although substitution of a relief valve in place of check valve 66 would prevent system pressure from ever rising above $P_r$, employing a relief valve in place of check valve 66 would cause air to be expelled to the atmosphere each time spindlehead 42 is moved downwardly, obviously a wasteful practice. In contrast, once receiver 73 is charged, no additional air need be admitted thereto except to make up for small leaks and small thermodynamic losses.

It should be noted that although air cylinder 50 has been illustrated and described with piston chamber 52 affixed to machine upright 28 and piston 54 affixed to spindlehead 42, air cylinder 50 would be equally operative to counterbalance spindlehead 42 against gravitational force if piston chamber 52 were mounted to spindlehead 42 and piston 54 mounted to machine upright 28. Each air cylinder 50 could also be arranged to push rather than pull spindlehead 42 upwardly.

Referring back to FIGS. 1 through 3, upright 28 includes a recess 78 therein adjacent to table 18. A pair of ways 80a and 80b (best illustrated in FIG. 1) are fastened to bed 12 parallel to axis 26 (illustrated in FIG. 2) so as to extend into recess 78. As is best illustrated in FIGS. 1 and 3, a tool storage magazine 82 is slidably mounted on ways 80a and 80b for movement therealong. Tool storage magazine 82 is advanced from or retracted into recess 78 along ways 80a and 80b by an air cylinder 84 (illustrated in FIG. 3) fastened at one end to bed 12 and at the other end to the tool storage magazine.

In the presently preferred embodiment, tool storage magazine 82 takes the form of a drum comprised of a disc 88 (illustrated in FIG. 3) having a plurality of tapered shank or straight shank tool grippers 90a and 90b, respectively, fastened to disc 88 about the perimeter thereof by bolts 92 for gripping straight shank and tapered shank toolholders 94a and 94b, respectively.

Although disc 88 is depicted in FIG. 3 as having both tapered and straight shank tool grippers fastened about the perimeter thereof for the purpose of illustration, in practice, disk 88 has only one type of tool gripper, either straight shank or tapered shank, affixed thereto about the perimeter thereof. This is because the machine tool spindle is usually configured to receive only one type of toolholder such as a tapered shank toolholder and cannot, for example, without modification, accept a straight shank toolholder and vice versa.

Figure 5A:
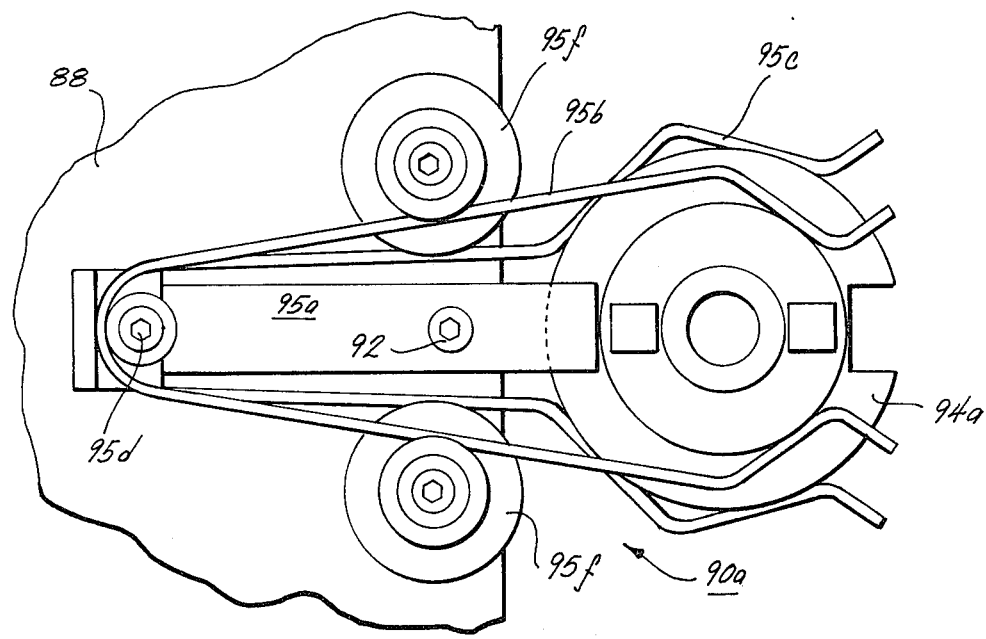
FIG. 5A is a bottom elevational view of a tapered shank tool gripper comprising a portion of the vertical machining center of FIG. 1.

The details of tapered shank tool gripper 90a are illustrated in FIG. 5a. Tool gripper 90a is comprised of a strap 95a which is fastened to disc 88 by bolts 92 so as to extend radially from the disc a short distance therebeyond for aligning tapered shank toolholder 94a held by the tool gripper. A pair of substantially V-shaped gripping wires 95b and 95c, respectively, stacked on top of one another, are each fastened at their closed end to strap 95a by a retaining screw 95d. The arms of gripping wires 95b and 95c are urged toward one another to engage grooves on tapered shank toolholder 90a by a separate one of a pair of wire retainers, each designated 95f, fastened to disc 88 on either side of strap 95a. Typically, each of wire retainers 95f is comprised of an annular collar having a pair of grooves inscribed about the circumference thereof for engaging a separate one of gripping wires 95b and 95c, respectively. Configured in this manner, wire retainers 95f assure firm retention of tapered shank toolholder 90a by gripping wires 95b and 95c, yet, permit release of the toolholder from the gripping wires once tapered shank toolholder 94 is firmly engaged in the machine tool spindle and disc 88 is moved laterally away from the spindle.

Figure 5B:
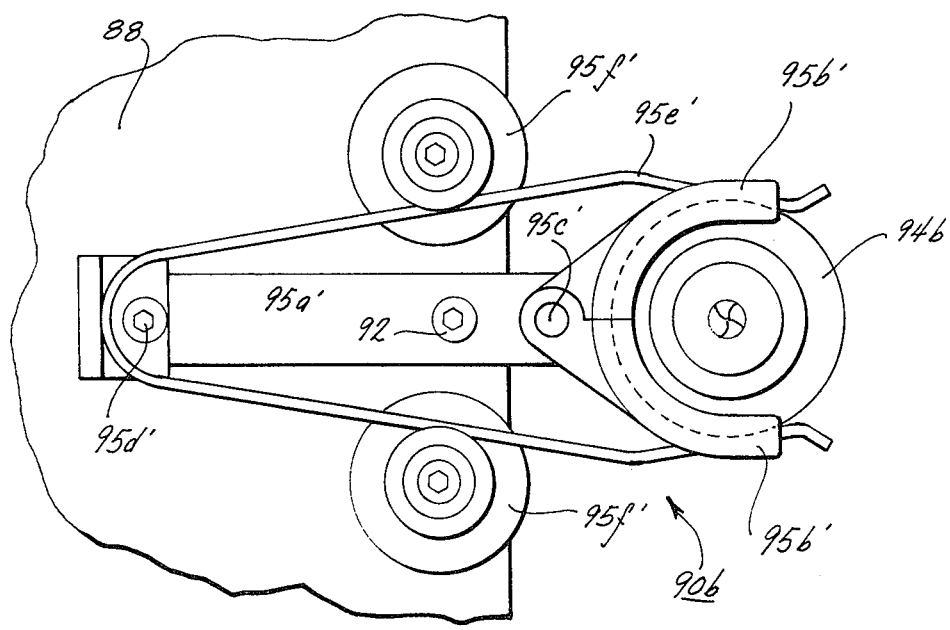
FIG. 5B is a bottom elevational view of a straight shank tool gripper comprising a portion of the vertical machining center of FIG. 1.

FIG. 5b illustrates the details of straight shank tool gripper 90b. Straight shank tool gripper 90b is comprised of a strap 95a' which is fastened to disc 88 by bolts 92 so as to extend radially from disc 88 a short distance therebeyond. A pair of jaws 95b' are pivotally fastened to the end of strap 95a' for clamping the shank of straight shank toolholder 94a. To firmly urge jaws 95b' against the shank of toolholder 94a, a V-shaped gripping wire 95c' is fastened at its closed end to strap 95a by a retaining screw 95d' and is urged at each of its sides against the jaws 95b' to engage a groove therein by a separate one of wire retainers 95f' fastened to disc 88 on either side of strap 95a'. Typically, each of wire retainers 95f' comprises an annular collar having a circumferential groove therein for engaging one of the sides of the gripping wire. Jaws 95b', when urged against one another by gripping wire 95c', firmly secure tool shank 94a, yet, they permit the tool shank to be disengaged therefrom when the tool shank is firmly gripped in the spindle and disc 88 is moved laterally from the spindle during the tool change cycle.

Referring back to FIG. 3, disc 88 is carried by a shaft 96 which is journaled to a housing 97 that is slidably mounted by bearings (not shown) to ways 80a and 80b for movement therealong. A motor 98 is affixed by plate 99 to housing 97 so that the shaft of motor 98 is parallel to shaft 96. The shaft of motor 98 is coupled by a chain or belt (not shown) to shaft 96 so that shaft 96, and hence, disc 88, are rotatably driven by motor 98 to rotate a selected one of the toolholders, held by a separate one of the tool grippers on disc 88, to a ready position to facilitate tool exchange. The angular position of disc 88, with respect to a non-rotatable member, such as spindlehead 42, is determined by an angular position transducer 100, which is typically a resolver. Resolver 100 is coupled to motor 98 and generates an electrical control signal which varies in accordance with motor 98 shaft rotation. Since the shaft rotation of motor 98 is directly related to the rotation of disc 88, the resolver output signal provides an accurate indication of the position of disc 88 with respect to spindlehead 42. The output signal of resolver 100 is supplied to a machine tool numerical control system 101, which controls motor 98 rotation responsive to the resolver output signal in accordance with commands from the machine tool control system (not shown).

Figure 6:
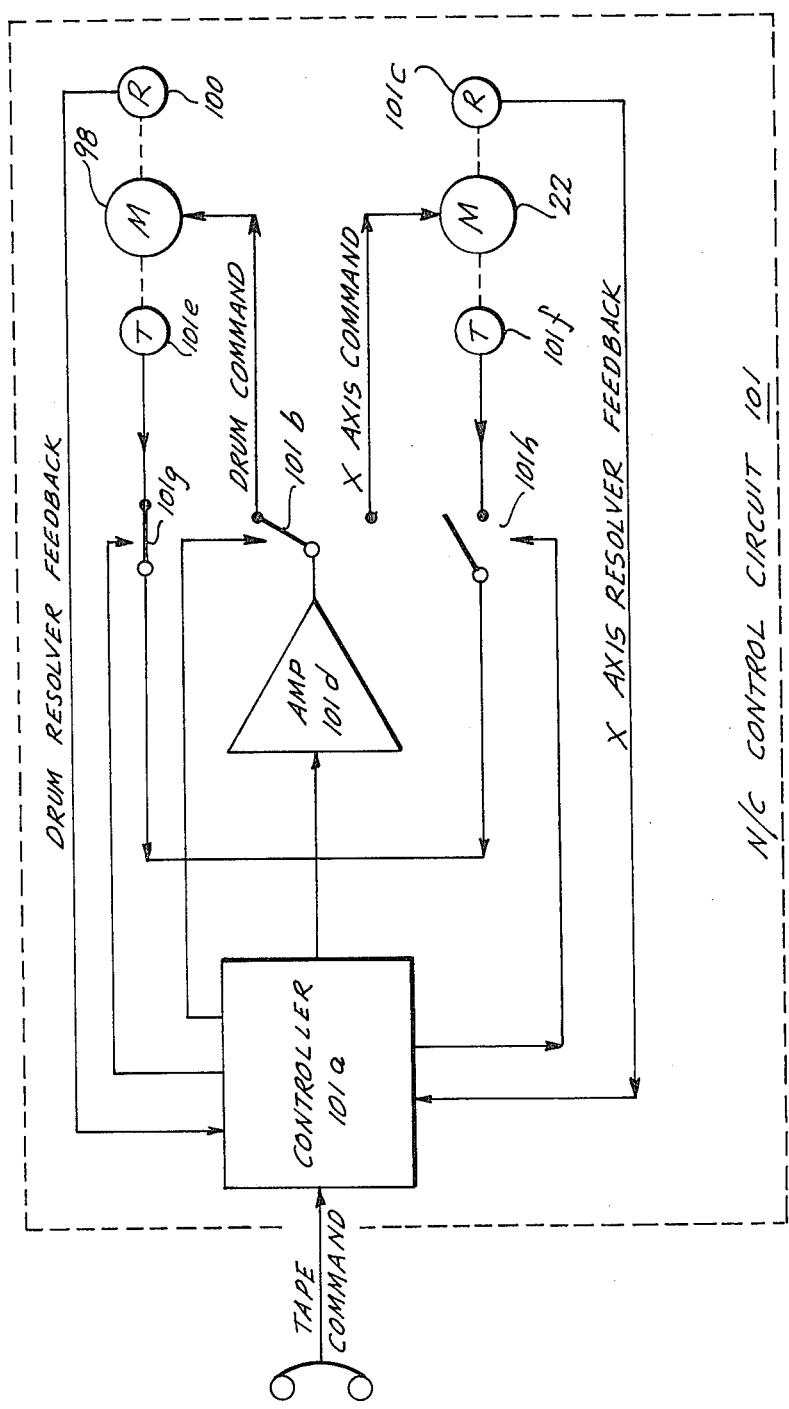
FIG. 6 is an electrical schematic diagram of the numerical control circuit comprising a portion of the machine tool of FIG. 1.

The details of the numerical control circuit 101 are shown schematically in FIG. 6. A controller 101a, typically a programmed electronic data processing device with internal memory, is coupled to the machine tool control system (not shown) for receiving commands therefrom, typically stored on tape, which specify a particular one of the tool grippers on the tool storage drum. Controller 101a is also coupled to resolver 100 to receive feedback information indicative of drum motor 98 angular shaft position and processes the machine tool control system tool storage drum rotation tape command together with the output signals produced by resolver 100, in the manner described hereinafter, to produce a drum motor command signal for exciting motor 98. During intervals between receipt of successive tool storage drum rotation tape commands, controller 101a advantageously generates X axis motor command signals to excite motor 22 (FIG. 1) which drives an associated ball screw to propel table 18 (FIG. 1) along axis 16 (FIG. 2) in accordance with machine tool control system X axis table movement tape commands and output signals from a resolver 101c coupled to motor 22.

The output signal from controller 101a, which is either a drum motor command signal, or an X axis motor command signal, depending on whether the machine tool control system tape commands supplied the controller are tool storage drum rotation tape commands or X axis table movement tape commands, respectively, is supplied to the input of an amplifier 101d where it is summed with the output signal of a respective one of tachometers 101e and 101f which are responsive to drum motor 98 and motor 22 shaft speed, respectively. Tachometers 101e and 101f are coupled to the input of amplifier 101d through a separate one of electronically actuated switches 101g and 101h, respectively, which are controlled by controller 101a so that when the controller is generating drum motor command signals, switch 101g is closed and switch 101h is open. During intervals when controller 101a is generating X axis motor command signals, the conduction state of switches 101g and 101h is thus reversed.

An electronically actuated switch 101i, responsive to commands from controller 101a, couples the output of amplifier 101d between drum motor 98 and motor 22 so that only the drum motor receives drum motor command signals from the controller, and likewise, only motor 22 receives X axis motor command signals from the controller.

In operation, when either a machine tool control system drum rotation tape command, specifying a particular tool gripper whose position on the drum is known to the controller, or an X axis table movement tape command, specifying the desired X axis coordinate position of table 18, is received by controller 101a, the controller references its internal memory to determine the previous tool storage drum angular position or X axis table position, respectively, and then generates a drum motor command signal, or an X axis motor command signal, in accordance with the input tape command from the machine tool control system, the output signal of a respective one of resolvers 100 and 101b, respectively, and the previously stored position information in internal memory. The controller output command signal, being either a drum motor command signal or an X axis motor command signal, is summed with the output signal of a respective one of tachometers 101e or 101f and then amplified before being supplied to a respective one of motors 98 and 22 to cause the desired rotation of the tool storage drum or the desired X axis movement of table 18, respectively. By servo controlling motor 98 in accordance with output signal of resolver 100, and by servo controlling the motor 22 in accordance with the output signal of resolver 101c, accurate angular positioning of tool storage drum and accurate X axis positioning of the table is thus assured.

To shield the toolholders, as well as disc 88 and housing 97 from metal chips and coolant disseminated during the machining operations, tool storage magazine 82 includes a cover 102 for substantially sealing the open end of recess 78 adjacent to spindlehead 42. Cover 102 typically consists of a pair of quarter-cylindrical sections which are each mounted to the flanged end of a bushing 104 which rotates about the end of shaft 96 distal from slides 80a and 80b. When tool storage magazine 82 is retracted into recess 78, spring means (not shown) urges the two cylindrical sections of cover 102 together to shield the tool storage magazine. Advancing tool storage magazine 82 along ways 80a and 80b from recess 78 causes a cam 106 on the outer surface of cover 100 to engage a block 108 fastened to the top wall of recess 78, thereby forcing the two sections of cover 100 apart so that toolholders 94a and 94b on dics 88 may extend through this opening.

As previously indicated, metal chips and coolant are disseminated during machining operations. To protect ways 24a and 24b (best illustrated in FIG. 1) from any damage caused by the disseminated coolant and chips, a rubber cover 108 (shown in FIG. 3) is fastened at one end to the base of upright 28 adjacent to spindlehead 42 and at the other end to a spring-wound roller 110 mounted on bed 12 beneath ways 24a and 24b. As upright 28 moves along ways 24a and 24b, spring-loaded roller 110 (shown in FIG. 3) keeps cover 108 sufficiently taut so that the cover will not bunch up and be caught between the upright and ways 24a and 24b.

Figure 7A:
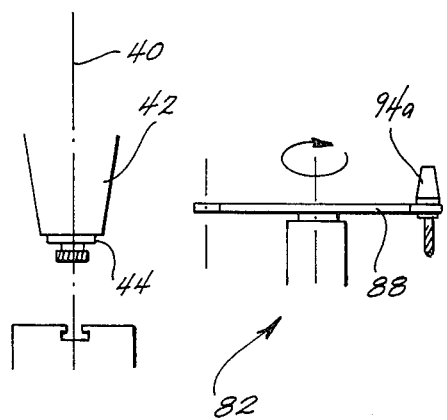
FIGS. 7A to 7J are schematic sequential illustrations of the position of the spindlehead and the tool storage drum of the vertical machining center of FIG. 1 during a tool change cycle.
Figure 7B:
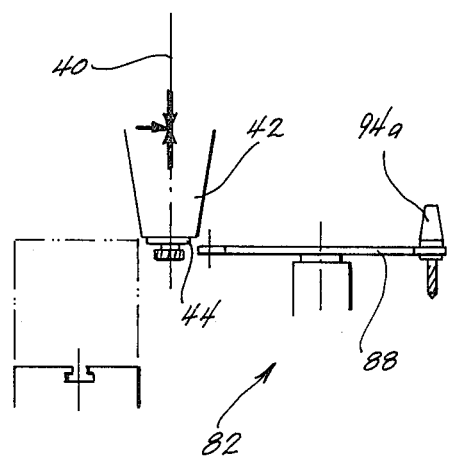
Figure 7C:
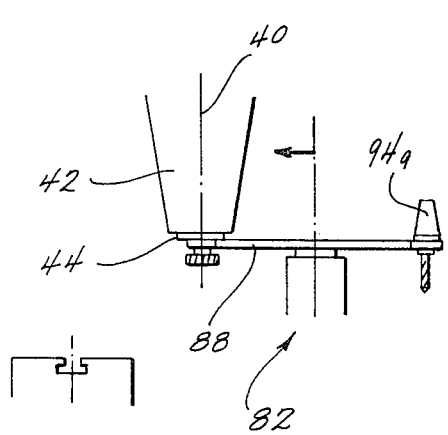
Figure 7D:
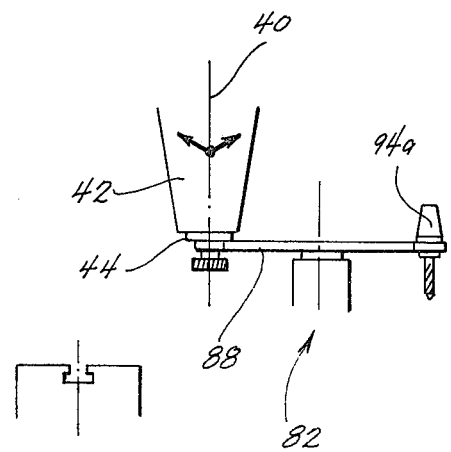
Figure 7E:
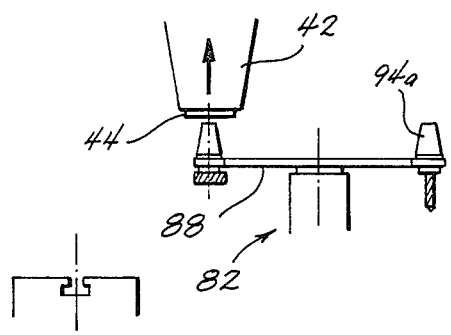

A complete tool change cycle will now be described with respect to FIGS. 7A through 7J, respectively. To simplify discussion of the tool change cycle, it is assumed that a toolholder is presently secured in the machine tool spindle and that the machine tool spindle is performing a designated machining operation, such as drilling, milling, tapping, or the like. Following completion of the machining operation, tool exchange is initiated by indexing tool storage magazine 82, that is, rotating disc 88 as illustrated in FIG. 7A, to place the empty tool gripper 90a on the disc assigned to the tool then held in the machine tool spindle to the ready position. Next, spindlehead 42 is moved to a tool change position, as illustrated in 7B, so as to be adjacent to the empty tool gripper on disc 88. Once spindlehead 42 is moved to the tool change position, tool storage magazine 82 is advanced from the recess in the machine tool upright, as illustrated in FIG. 7C, so that the empty tool gripper on disc 88 engages the tool then held in spindle 44. When the empty tool gripper on disc 88 firmly engages the tool then held in spindle 44, the spindle unclamps the tool, as illustrated in FIG. 7D, and then, spindlehead 42 is moved upwardly, as depicted diagrammatically in FIG. 7E, so that spindle 44 can clear the shanks of toolholders 90a secured to disc 88.

Figure 7F:
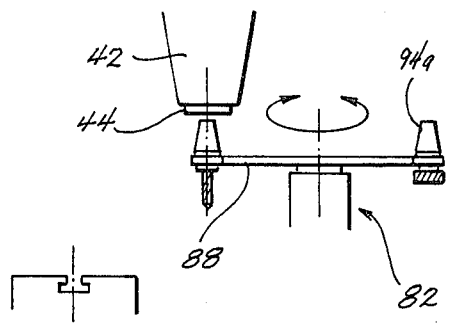
Figure 7G:
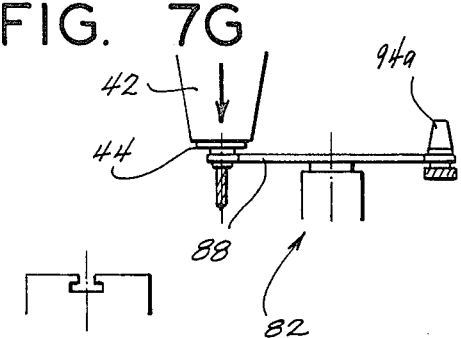
Figure 7H:
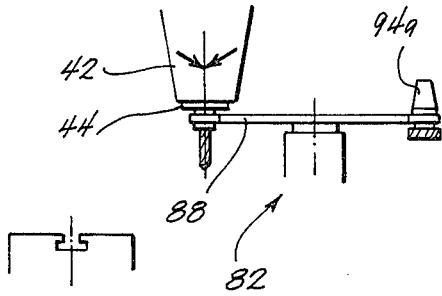
Figure 7I:
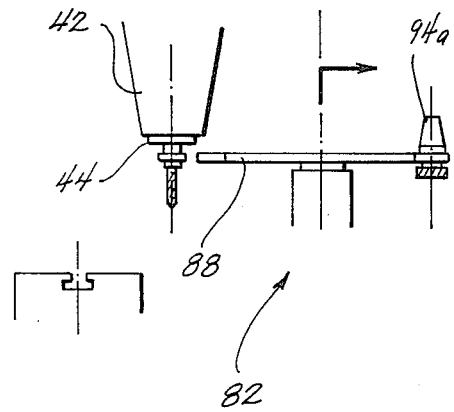
Figure 7J:
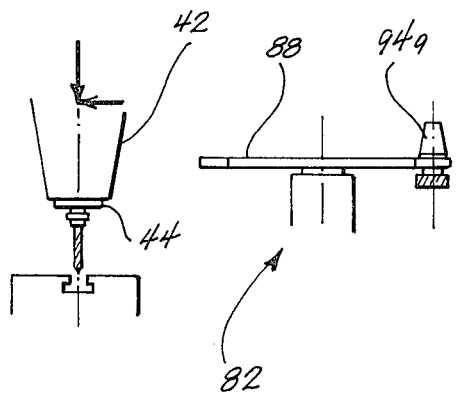

Following upward movement of spindlehead 42, tool storage magazine 82 is indexed to position the selected one of toolholders 90a directly beneath spindle 44, as illustrated in FIG. 7F. Next, spindlehead 42 is moved downwardly, as shown in FIG. 7G, so that spindle 44 engages the tool positioned directly therebeneath. Once the new tool is firmly engaged in spindle 44, spindle 44 then clamps the new tool, as illustrated in FIG. 7H, and thereafter, tool storage magazine 82 is retracted into the recess in the machine tool upright, as illustrated in FIG. 7I. The machine tool change cycle is completed following movement of spindlehead 42 to the workpiece, as illustrated in FIG. 7J.

From the foregoing description, it can readily be observed that the present invention provides a vertical machining center which automatically accomplishes tool exchange without the necessity of a tool transfer arm. Since tool exchange is accomplished in the present invention by moving both the tool storage magazine and the machine spindlehead, the need for a transfer arm is thereby obviated, thus reducing machine tool complexity and expense. Although vertical machining center 10 has been described with a tool storage magazine 82 slidably mounted on bed 12 for linear movement in a direction parallel to the direction of linear movement of upright 28, in certain applications it may be desirous to fix the position of tool storage drum 82 so that it partially extends into recess 78 of the upright. When tool storage driver 82 is mounted to the bed 12 for rotation about a fixed axis, tool exchange is facilitated by moving upright 28 to and from the tool storage drum.

While certain features of the invention have been shown by way of illustration, many modifications and changes will occur to those skilled in the art. It is, therefore, to be understood that the appended claims are intended to cover all such modifications and changes as fall within the true spirit of the invention.

The principles of this invention having now been fully explained in connection with the foregoing, we hereby claim as our invention:

1. An automatic tool changing machining center effectuating rapid exchange of cutting tools comprising:
    a bed;
    a workpiece holding table slidably mounted on said bed for movement along a first axis;
    a vertically extending upright mounted on said bed said upright having a recess therein adjacent to said workpiece holding table;
    means for effecting relative movement between said workpiece holding table and said upright along a second axis perpendicular to said first axis;
    a spindlehead slidably mounted on said upright so as to overlie a portion of said workpiece holding table, said spindlehead being vertically movable on said upright along a third axis orthogonal to said first and second axes;
    a cutter carrying spindle journaled in said spindlehead for rotation about an axis parallel to said third axis for rotating the cutter to perform a work operation;
    a tool storage magazine mounted on said bed in said recess;
    a plurality of tool carriers on said magazine with each of said carriers being adapted to support a tool for use in said spindle;
    a tool ready station on said magazine for receiving any one of said tool carriers to position it for a tool change operation;
    means for moving the tool carrier with the selected tool into said tool ready station; and
    means for effecting relative movement between the tool storage magazine and said upright to cause said tool carrier at said tool ready station to be located in alignment with and to be located distal from said spindle in performing the tool change operation.

2. The invention according to claim 1, wherein said tool storage magazine comprises:
    a pair of ways fastened on said bed substantially within said recess, said ways each being parallel to said second axis;
    a housing slidably mounted on said ways for movement therealong;
    a shaft journaled in said housing for rotation about an axis parallel to said third axis;
    a disc fastened to said shaft for co-joint rotation therewith, said disc having a plurality of tool grippers fastened thereto about the perimeter thereof;
    means fastened to said housing for rotatably driving said shaft; and
    means fastened to said bed and said housing for slidably moving said housing along said ways.

3. The invention according to claim 2, wherein said means fastened to said housing for rotatably driving said shaft comprises a servo controlled motor.

4. The invention according to claim 3, further including resolver means coupled to said motor for providing an output signal indicative of the angular position of said disk.

5. The invention according to claim 2, wherein said means fastened to said housing and said bed for slidably moving said housing along said ways comprises an air cylinder.

6. The invention according to claim 2, wherein each of said tool grippers fastened to said disk about the perimeter thereof is configured to receive a tapered shank toolholder.

7. The invention according to claim 2, wherein each of said tool grippers fastened to said disk about the perimeter thereof is configured to receive a straight shank toolholder.

8. The invention according to claim 6, wherein each of said tool grippers comprises:
    a strap fastened to said disk so as to extend radially therefrom a predetermined distance therebeyond;
    first and second substantially V-shaped gripping wires stacked on top of each other and fastened at their closed end to said strap so that each gripping wire opens radially outward; and
    a pair of wire retainers fastened to said disk on opposite sides of said strap for urging the sides of each of said first and second gripping wires toward one another to engage a tapered shank toolholder.

9. The invention according to claim 7, wherein each of said tool grippers comprises:

a strap fastened to said disk so as to extend radially therefrom a predetermined distance therebeyond;

a pair of jaws pivotally fastened to the end of said strap distal from said disk for gripping the shank of a straight shank toolholder;

a substantially V-shaped gripping wire fastened at its closed end to said strap so as to open radially outward; and a pair of wire retainers fastened to said disk on opposite sides of said strap for urging the sides of said tool gripping wires against said jaws to urge said jaws together.

10. The invention according to claim 1, further including counterbalancing means fastened between said spindlehead and said upright for counterbalancing said spindlehead against downward gravitational forces.

11. The invention according to claim 10, wherein said counterbalancing means comprises:

a source of pressurized compressible fluid;

a cylinder having its end affixed to said machine tool upright, said cylinder having a first port situated adjacent to said cylinder end and having a second port communicating therewith distal from said first port;

a piston having its end affixed to said spindlehead for reciprocal movement within said cylinder between said first and second cylinder ports responsive to movement of said spindlehead;

an air line coupled between said source of pressurized compressible fluid and said second cylinder port for carrying pressurized compressible fluid into said cylinder to fill the expanding cylinder volume as said piston ascends into said cylinder so as to exert a force on said piston opposite the gravitational force on said spindlehead; and an air receiver coupled to said air line between said cylinder and said source of pressurized compressible fluid for reducing pressure fluctuations of the pressurized compressible fluid supplied to said cylinder.

12. The invention according to claim 11, wherein said air receiver takes the form of a stand alone metal tank.

13. The invention according to claim 10, wherein said tank takes the form of a sealed hollow within said machine upright having a port coupled to said air line.

14. The invention according to claim 10, wherein said counterbalancing means comprises:

a source of pressurized compressible fluid;

a cylinder having its end affixed to said machine tool upright, said cylinder having a first port adjacent to said cylinder end and having a second port distal from the cylinder end;

a piston affixed at its end to said spindlehead for limited reciprocal movement within said cylinder between said first and second cylinder ports responsive to movement of said spindlehead; and an air line coupled between said source of pressurized compressible fluid and said second cylinder port for carrying pressurized compressible fluid into said cylinder to pressurize said cylinder and to fill the expanding volume of said cylinder as said piston ascends a limited distance into said cylinder to exert a force on said piston opposite to the gravitational force on said spindlehead.

15. An automatic tool changing machining center comprising:

a bed;

a workpiece holding table slidably mounted on said bed for movement along a first axis;

a vertically extending upright slidably mounted on said bed for movement along a second axis perpendicular to said first axis, said upright having a recess therein adjacent to said bed;

a spindlehead slidably mounted on said upright for overlying said table, said spindlehead being movable on said upright along third axis orthogonal to each of said first and second axes;

a spindle journaled to said spindlehead for rotation about said third axis; and a tool storage magazine fastened to said bed so as to partially extend into said recess, said tool storage magazine having a plurality of tool grippers thereon each securing a toolholder therein, said tool storage magazine being rotatable about an axis parallel to said third axis to position a selected one of said tool grippers in a ready position within the path of travel of said spindle as positioned by movement of the upright so that said spindle can engage a selected one of said tool grippers to return a toolholder thereto and to receive a toolholder therefrom.

* * * * *